(12) United States Patent
Jang et al.

(10) Patent No.: US 10,986,771 B2
(45) Date of Patent: Apr. 27, 2021

(54) MANUAL GRANULE SPREADER

(71) Applicant: JANG AUTOMATION CO., LTD., Cheongju-si (KR)

(72) Inventors: Jae Su Jang, Cheongju-si (KR); Byoung Woo Jun, Daejeon (KR); Sang Jo Kim, Cheongju-si (KR)

(73) Assignee: JANG AUTOMATION CO., LTD., Cheongju-si (KR)

( * ) Notice: Subject to any disclaimer, the term of this patent is extended or adjusted under 35 U.S.C. 154(b) by 92 days.

(21) Appl. No.: 16/182,529

(22) Filed: Nov. 6, 2018

(65) Prior Publication Data
US 2020/0060072 A1 Feb. 27, 2020

(30) Foreign Application Priority Data
Aug. 23, 2018 (KR) .................. 10-2018-0098328

(51) Int. Cl.
| | | |
|---|---|---|
| *A01C 7/12* | (2006.01) | |
| *A01C 7/18* | (2006.01) | |
| *A01C 7/20* | (2006.01) | |

(52) U.S. Cl.
CPC ............... *A01C 7/125* (2013.01); *A01C 7/18* (2013.01); *A01C 7/206* (2013.01)

(58) Field of Classification Search
CPC .. A01C 7/08; A01C 7/12; A01C 7/125; A01C 7/16; A01C 7/163; A01C 7/166; A01C 7/18; A01C 7/206; A01C 11/02
USPC .................................................. 74/11–15.88
See application file for complete search history.

(56) References Cited

U.S. PATENT DOCUMENTS

| | | | | | |
|---|---|---|---|---|---|
| 854,424 | A | * | 5/1907 | Ketterer | A01D 34/412 56/253 |
| 1,334,223 | A | * | 3/1920 | Byrd | A01C 7/12 222/485 |
| 1,551,564 | A | * | 9/1925 | Hinrichsen | A01C 7/12 172/500 |
| 2,547,867 | A | * | 4/1951 | Judson | A01C 19/00 222/139 |
| 4,109,538 | A | * | 8/1978 | Glenday | F02N 3/02 123/185.2 |
| 5,485,963 | A | * | 1/1996 | Walto | A01C 15/02 222/623 |

(Continued)

FOREIGN PATENT DOCUMENTS

JP 408140442 * 6/1996 .......... F02B 2075/025

*Primary Examiner* — Qingzhang Zhou
*Assistant Examiner* — Christopher R Dandridge
(74) *Attorney, Agent, or Firm* — Rabin & Berdo, P.C.

(57) ABSTRACT

Disclosed is a manual granule spreader including: a main body including a wheel and a handle bar; a hopper having a plurality of discharge chutes; a spreading module having a spreading roller so as to spread the granules via first spreading means; a power transmission means.

According to the granule spreader, manpower applied to the wheel is used to spread granules in the hopper in a predetermined amount in a single direction or opposite directions for drill seeding or for broadcast seeding, whereby workforce is saved, granules are prevented from being wasted, and the direction, angle, and length of the spreading means are adjusted, and a flexible driving wire is used to transmit power for spreading granules, which allows a vertical spreading position of the granules to be easily controlled by a vertical position adjustment of the hopper.

13 Claims, 14 Drawing Sheets

(56) References Cited

U.S. PATENT DOCUMENTS

| | | | |
|---|---|---|---|
| 8,839,692 B2 * | 9/2014 | Yanai | A01B 33/028 74/551.4 |
| 2002/0100401 A1 * | 8/2002 | Lempriere | A01C 7/125 111/178 |

* cited by examiner

MANUAL GRANULE SPREADER

CROSS REFERENCE TO RELATED APPLICATION

The present application claims priority to Korean Patent Application No. 10-2018-0098328, filed Aug. 23, 2018, the entire contents of which is incorporated herein for all purposes by this reference.

BACKGROUND OF THE INVENTION

Field of the Invention

The present invention generally relates to a manual granule spreader. More particularly, the present invention relates to a manual granule spreader, wherein manpower being applied to a wheel to push the wheel is used to spread granules loaded in a hopper in a predetermined amount in a single direction or opposite directions for drill seeding or for broadcast seeding, whereby workforce is saved, granules are prevented from being wasted, and the direction, angle, and length of a spreading means are adjusted, and a flexible driving wire is used to transmit power for spreading granules, whereby a vertical spreading position of the granules is controlled.

Description of the Related Art

In the conventional agricultural pesticide spraying method, since a farmer by himself sprays an agricultural pesticide to crops grown in a rice paddy or a field, it takes much time and manpower, and the usage amount of the agricultural pesticide is not proper, which damages crops or soil.

Accordingly, in recent years, after loading agricultural pesticides in a hopper of an agricultural pesticide sprayer, the agricultural pesticide sprayer is connected to a farm machine such as a farm tractor or a cultivator, and power of the farm machine is used to drive the agricultural pesticide sprayer for spraying the agricultural pesticides.

Accordingly, since the agricultural pesticide sprayer connected to the farm machine uses power of the farm machine, the agricultural pesticide sprayer can carry a large amount of agricultural pesticide, keep a spraying area of the agricultural pesticide wide, and spray the agricultural pesticide without difficulty.

However, the agricultural pesticide sprayer connected to the farm machine is expensive and the job of connecting the farm machine supplying power to the agricultural pesticide sprayer is difficult and uncomfortable.

Furthermore, when the agricultural pesticide sprayer is connected to the farm machine, the entire volume of the machines increases. Accordingly, it is difficult to move the farm machine in a narrow space and thus spreading space of the agricultural pesticide is limited, and since the agricultural pesticide sprayer is required to be towed by the farm machine, the operation cost thereof is expensive.

In addition, as for the conventional agricultural pesticide sprayer, it is difficult to adjust the position or angle of an agricultural pesticide spraying part, and thus when a position on which agricultural pesticide is sprayed varies, it is difficult to precisely spray the agricultural pesticide.

That is, when growing a scallion, soil around the scallions is earthed up to prevent the scallion from falling down, and when the earthing-up is done to lengthen a white part of the scallion, a position on which agricultural pesticide is sprayed rises, whereby it is necessary to adjust a vertical position of an agricultural pesticide sprayer.

However, as for the conventional agricultural pesticide sprayer, since it is difficult to adjust a vertical position of the sprayer, it is difficult to spray the agricultural pesticide on topsoil which is earthed up and to precisely control the spraying amount of the agricultural pesticide.

Document of Related Art (Patent Document 1) Korean Utility Model Application Publication No. 20-1994-0014146 (published on Jul. 16, 1994)

SUMMARY OF THE INVENTION

Accordingly, the present invention has been made keeping in mind the above problems occurring in the related art, and the present invention is intended to propose a manual granule spreader, wherein manpower being applied to a wheel being pushed is used to spread granules loaded in a hopper in predetermined amounts in a single direction or opposite directions for drill seeding or for broadcast seeding.

Furthermore, the present invention is intended to propose a manual granule spreader, wherein the direction, angle, and length adjustments of a spreading means of granules can be made so as to adjust spreading positions of the granules.

In order to achieve the above object, according to one aspect of the present invention, there is provided a manual granule spreader including: a main body 10 including a wheel 101a and a handle bar 103a so as to be driven by manpower; a hopper 20 having a plurality of discharge chutes 201 provided on a lower part thereof, granules loaded in the hopper being discharged through the plurality of discharge chutes 201; a spreading module 30 provided on a lower part of the hopper 20 and on an upper part of the main body 10, the spreading module including a spreading roller 303 rotatably provided therein so as to spread the granules discharged from the hopper 20 via first spreading means 304 positioned in opposite directions under the spreading module; a power transmission means 40 provided on one side of the main body 10, the power transmission means transmitting a rotational force of the wheel 101a to the spreading roller 303 and allowing the spreading roller 303 to spread the granules while the spreading roller is rotating.

The main body 10 may include: a wheel frame 101 having the wheel 101a provided on a lower end part thereof; a module frame 102 provided on one side of the wheel frame 101, the module frame having the spreading module 30 combined on an upper end part thereof; a handle frame 103, a first end part of which is rotatably hinged to an upper end part of the wheel frame 101, the handle frame having the handle bar 103a provided on a second end part thereof; and a stand frame 104 provided on one side of the handle frame 103, the stand frame having a stand 104a provided on a lower end part thereof.

The wheel frame 101 may include a support frame 101c provided on one side thereof, wherein a lower end part of the module frame 102 may be inserted into and fastened to the support frame 101c by a first fastening bolt 101e provided on one side of the support frame 101c so as to control a vertical movement of the module frame 102.

The wheel frame 101 may include an arc-shaped longitudinal hole 101d provided on an upper end part thereof, wherein the handle frame 103 being rotatably hinged to the upper end part of the wheel frame 101 may be bolted to the arc-shaped longitudinal hole 101d so as to adjust an angle of the handle frame 103 along the arc-shaped longitudinal hole 101d.

The handle frame 103 may include a guide tube 103c provided on one side thereof, wherein an upper end part of the stand frame 104 may be inserted into and fastened to the guide tube 103c by a second fastening bolt 103d provided on one side of the guide tube 103c so as to control a vertical movement of the stand frame 104.

The hopper 20 may include; the plurality of discharge chutes 201 provided on a lower part of the hopper 20 at predetermined intervals so as to discharge the granules loaded in the hopper 20; and a chute plate 202 provided on an upper part of each of the discharge chutes 201 to slide to a rear of the hopper 20 so as to open and close the discharge chute 201.

The spreading module 30 may include; a roller case 301 having inlets 301a provided on an upper part thereof and outlets 301b provided on a lower part thereof in opposite side directions thereof, wherein the inlets are connected to the discharge chutes 201 and the outlets 301b communicate with the inlets 301a; the spreading roller 303 rotatably provided in the roller case 301, the spreading roller including multiple insertion grooves 303a provided on an outer circumferential surface thereof along a circumference thereof, with the granules supplied from the plurality of discharge chutes 201 being inserted into the insertion grooves; and the first spreading means 304 connected to the outlets 301b so as to adjust a spreading position and a vertical position of the granules discharged through the outlets 301b.

Each of the first spreading means 304 may be configured to be a joint hose 304a.

The first spreading means 304 may be configured to have a joint hose 304a of a predetermined length provided on a first end part thereof and to have a telescopic tube 304b, which is length-adjustable, provided on a second end part thereof.

The power transmission means 40 may include: a drive sprocket 401 provided on an end portion of a rotation shaft of the wheel 101a; a following sprocket 402 provided on one side surface of the main body 10 so as to be spaced apart from the drive sprocket 401 at a predetermined distance; a roller chain 403 connecting the drive sprocket 401 and the following sprocket 402 therebetween; and a driving wire 404, which is flexible, provided between the following sprocket 402 and the spreading roller 303 so as to transmit a rotational force of the following sprocket 402 to the spreading roller 303, so that the driving wire may transmit the rotational force to the spreading roller 303 though the hopper 20 moves vertically.

In addition, according to the present invention, the manual granule spreader may further include: a blockage-prevention part 50 detecting spreading-malfunction due to blockage of the granules being spread from the spreading module 30 and releasing the blockage of the granules by using vibration.

The blockage-prevention part 50 may include; a spread-detection sensor 501 provided on a lower end part of each of the first spreading means 304 so as to detect the granules spread by the first spreading means 304; vibrating means 502, 503 provided on each one side of the spreading module 30 so as to cause vibration; and a controller 504 controlling each of the vibrating means via a detection signal supplied by the spread-detection sensor 501.

The vibrating means may include a first vibrating motor 502 provided on one side of a roller case 301 of the spreading module 30 and a second vibrating motor 503 provided on one side of the first spreading means 304 of the spreading module 30, wherein while the first vibrating motor 502 and the second vibrating motor 503 may be alternately vibrated by the controller 504 when spreading-malfunction is detected by the spread-detection sensor 501, the roller case 301 and the first spreading means 304 may be alternately vibrated so as to release the granules blocked in the roller case 301 and the first spreading means 304.

The spreading module 30 may include a second spreading means 305 and a broadcast seeding plate 306 replacing the first spreading means 304, wherein the second spreading means 305 may include: a discharge tube 305a provided on a lower part of the roller case 301 in a vertically downward direction such that an upper end part of the discharge tube is connected to the outlets 301b provided on the lower part of the roller case 301 in the opposite side directions thereof so as to emit the granules discharged from the roller case 301 by the spreading roller 303 in the vertically downward direction; and a broadcast seeding tube 305b, an upper end part of which is provided on a lower end part of the discharge tube 305a and including an opening part 305b-1 provided on a lower end part of the broadcast seeding tube, the opening part being narrow and long in a horizontal direction, so that the granules discharged through the discharge tube 305a are discharged in a narrow and long shape as a shape of the opening part 305b-1, and wherein the broadcast seeding plate 306 may include side walls 306b provided integrally on opposite sides of a slanting plate 306a inclined in a downward direction, each of the side walls being narrow in a width of an upper end part thereof and wide in a width of a lower end part thereof.

The manual granule spreader of the present invention uses manpower being applied to a wheel so as to push the wheel such that the manual granule spreader spreads granules loaded in the hopper in a predetermined amount in one direction or opposite directions for drill seeding or for broadcast seeding, thereby saving workforce and preventing the excessive spreading of granules.

Furthermore, the manual granule spreader of the present invention allows granules to be spread in a predetermined amount corresponding to a rotation number of the wheel when the main body having the wheel is pushed by manpower without an additional power, which makes a process of connecting an agricultural machine to the manual granule spreader unnecessary, thereby causing no operation cost and making manufacturing cost inexpensive due to a simple structure of the manual granule spreader.

In addition, the manual granule spreader of the present invention can control the spreading amount of granules through a gear ratio adjustment of the power transmission means.

Additionally, the manual granule spreader of the present invention is small in volume and is operated by manpower, thereby spreading granules even in a narrow place or a small-scale vinyl greenhouse difficult to drive an agricultural machine.

Furthermore, the manual granule spreader of the present invention can adjust the direction, angle, and length of the first spreading means for spreading granules finally, which facilitates the adjustment of a spreading position of the granules, whereby though vertical positions of topsoil vary during crop production, the precise spreading of the granules can be performed.

In addition, the manual granule spreader of the present invention can perform drill seeding in a single direction or opposite directions along crops while spreading granules or can perform broadcast seeding in front of the main body along an advancing direction of the main body while spreading a soil conditioner, thereby selectively spreading various kinds of granules such as agricultural pesticides, a fertilizer, and the soil conditioner according to the kinds of crops and soil.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, a manual granule spreader of the present invention is described according to the exemplary embodiments of the present invention, but is not limited to the embodiments described below. Although preferred embodiments of the present invention have been described for illustrative purposes, those skilled in the art will appreciate that various modifications, additions and substitutions are possible, without departing from the scope and spirit of the invention as disclosed in the accompanying claims.

Furthermore, though operation effects due to configuration of the present invention are not presented explicitly in describing the embodiments of the present invention, predictable effects due to the associated configuration should be appreciated.

Figure 1:
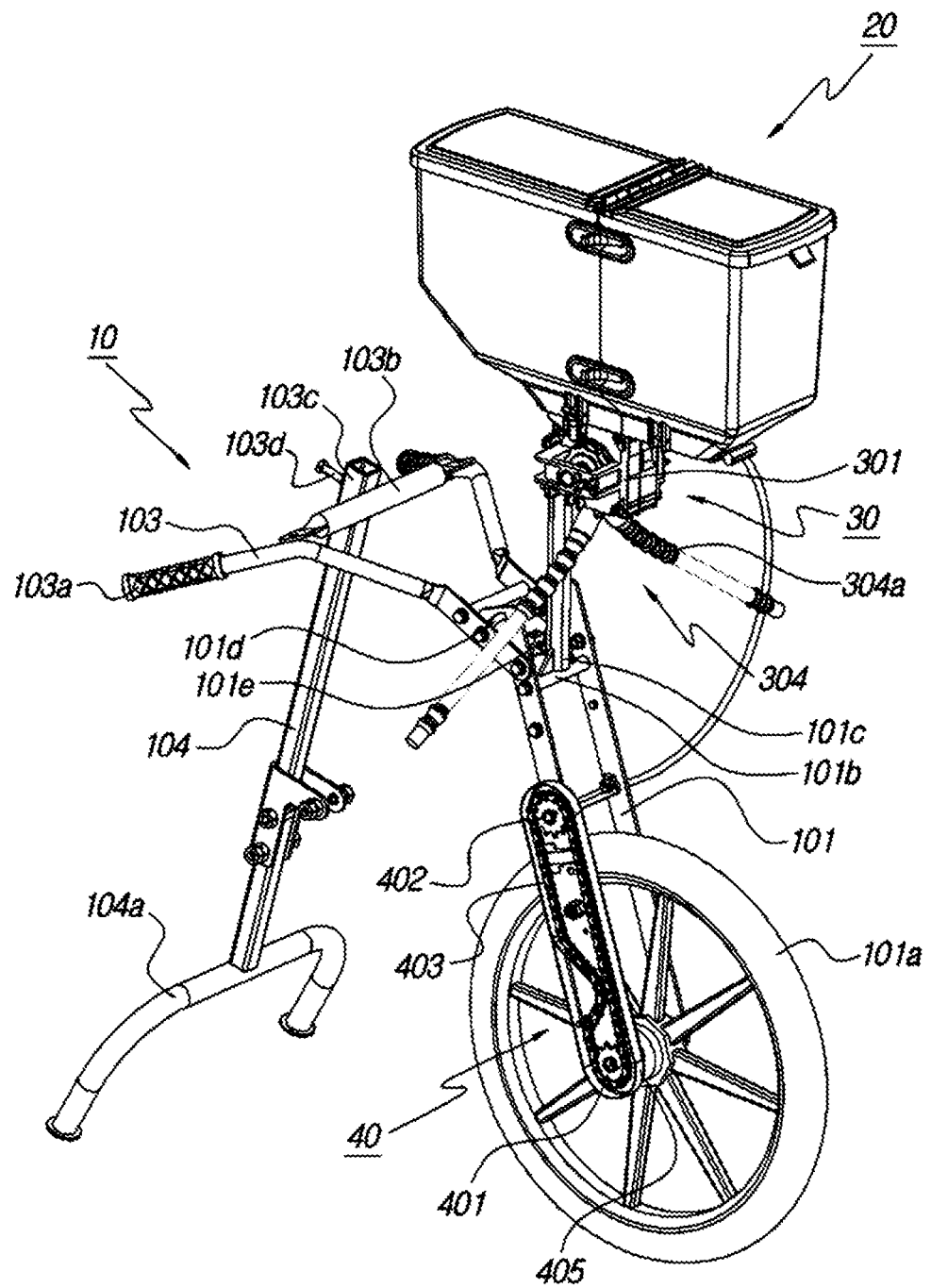
FIG. 1 is a perspective view according to a first embodiment of a manual granule spreader of the present invention.
Figure 2:
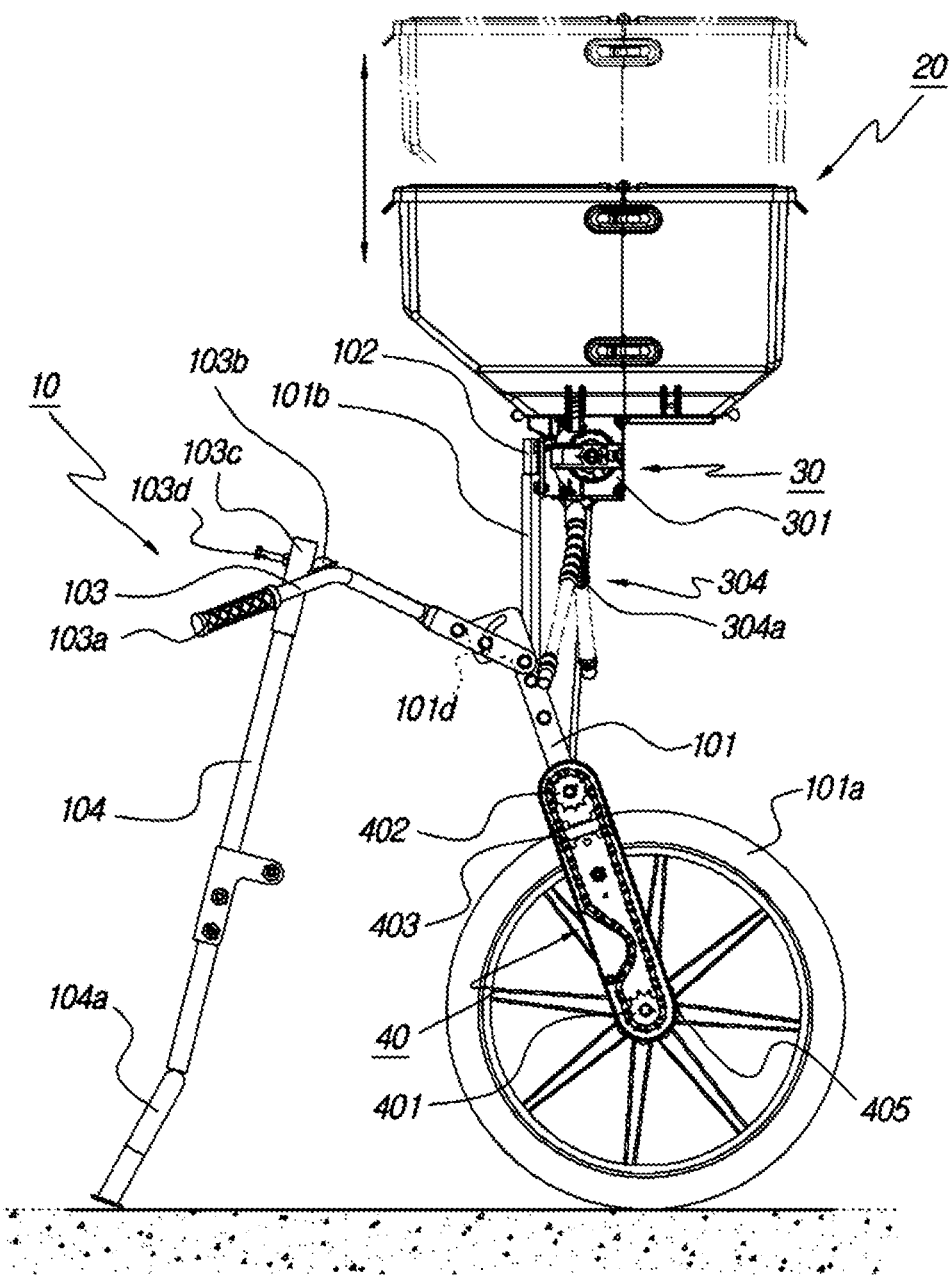
FIG. 2 is a side view showing vertical movement of a module frame according to the first embodiment of the manual granule spreader of the present invention.
Figure 3:
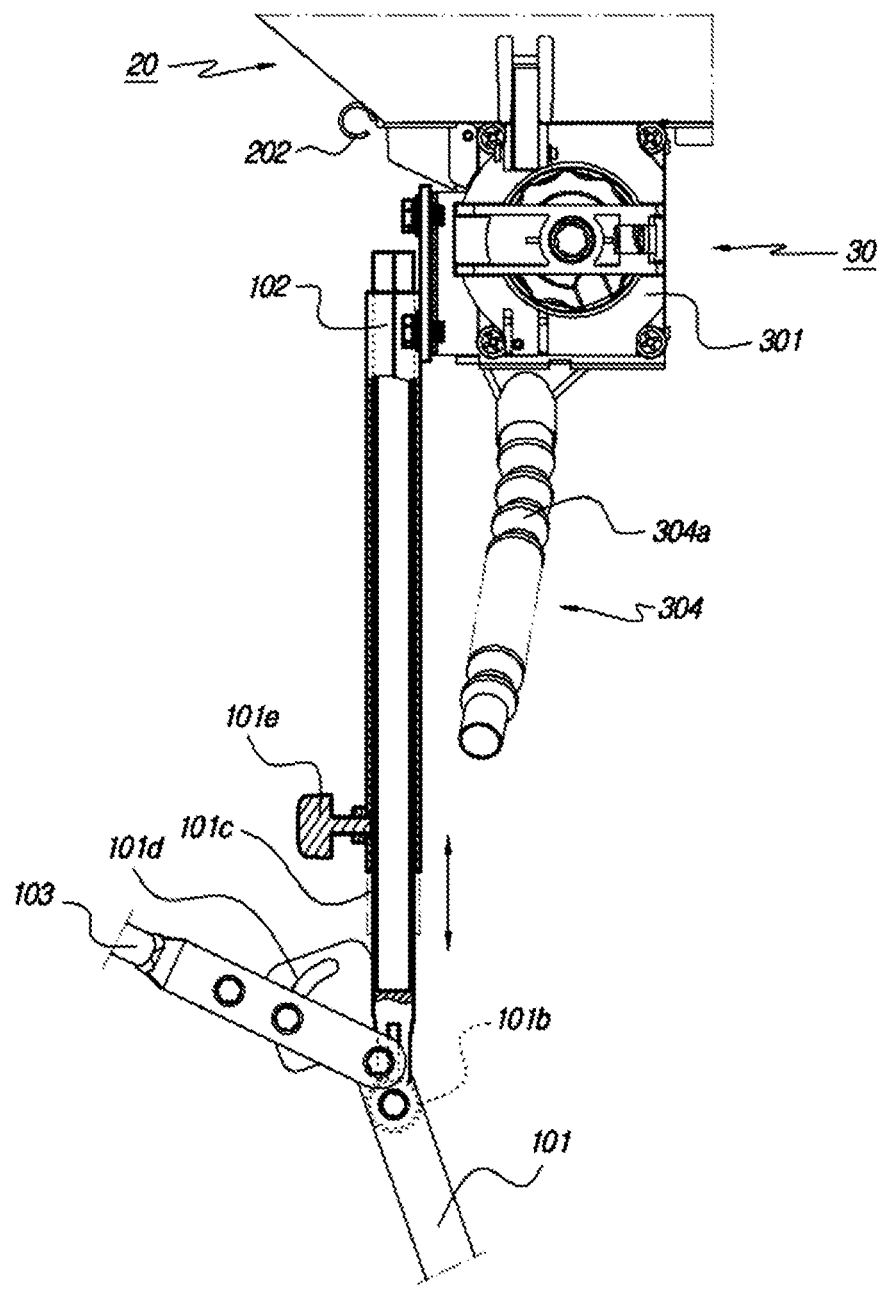
FIG. 3 is a partial cross-sectional view showing the configuration of the module frame according to the first embodiment of the manual granule spreader of the present invention.
Figure 4:
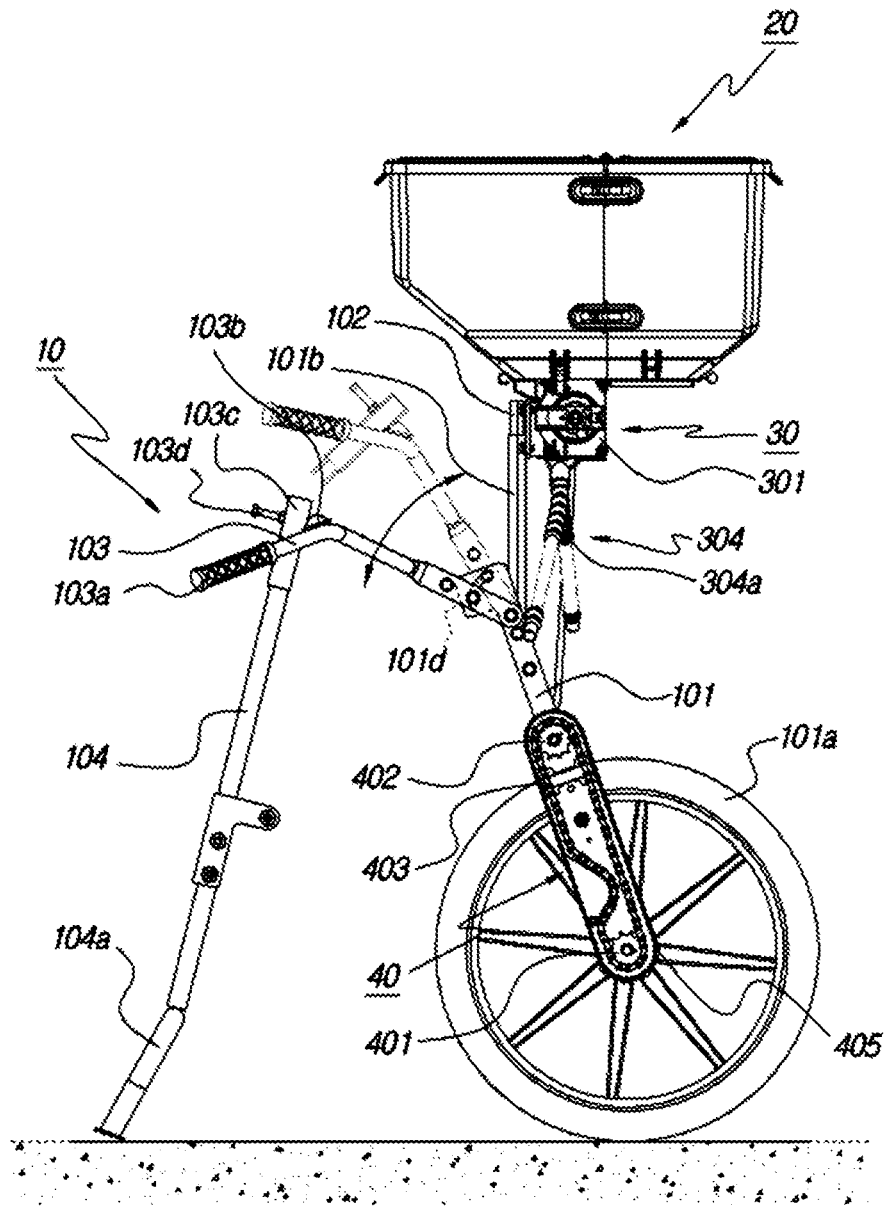
FIG. 4 is a side view showing a rotation movement of a handle frame according to the first embodiment of the manual granule spreader of the present invention.
Figure 5:
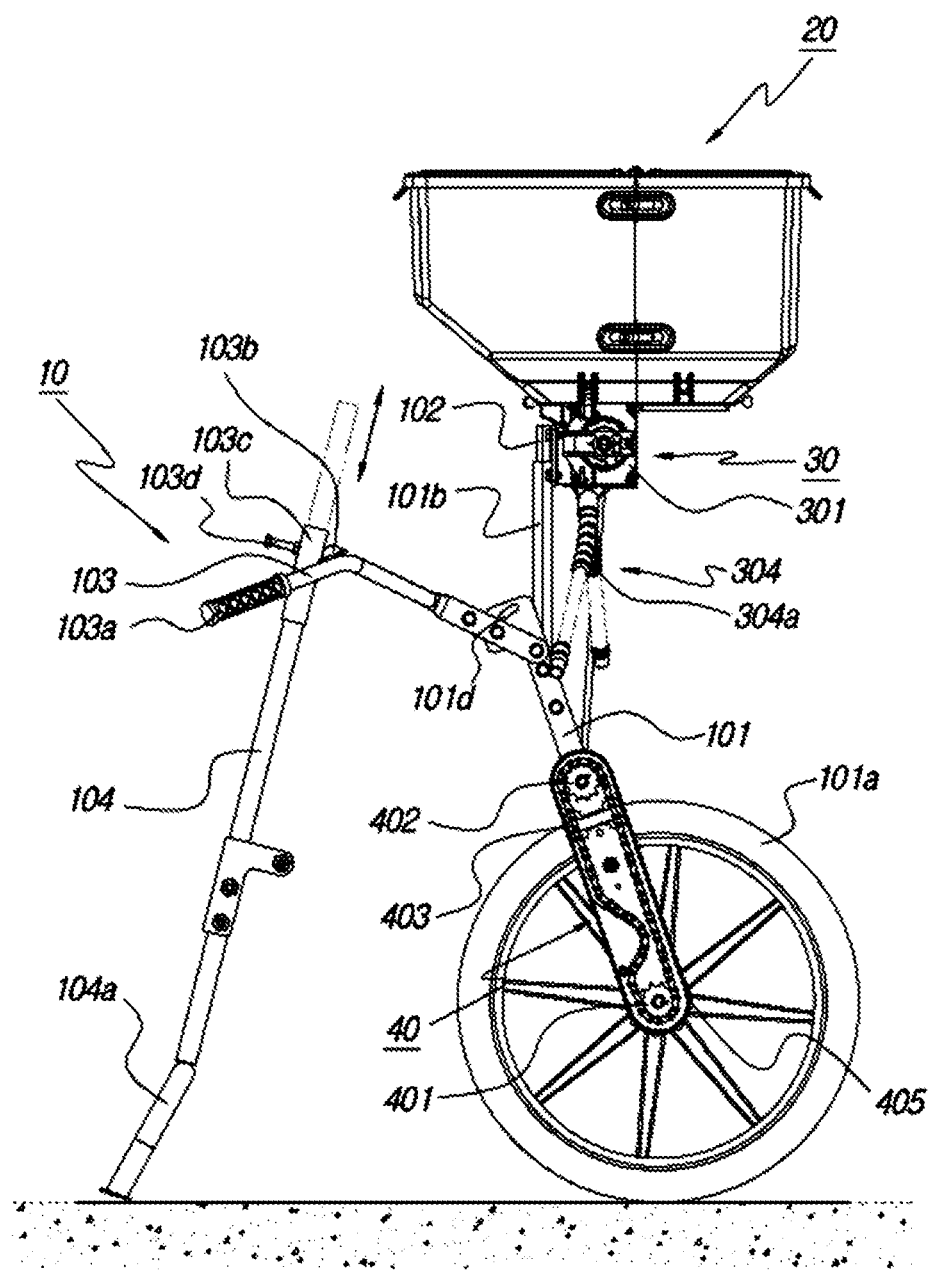
FIG. 5 is a side view showing a vertical movement of a stand frame according to the first embodiment of the manual granule spreader of the present invention.

FIG. 1 is a perspective view according to a first embodiment of a manual granule spreader of the present invention; FIG. 2 is a side view showing vertical movement of a module frame according to the first embodiment of the manual granule spreader of the present invention; FIG. 3 is a partial cross-sectional view showing the configuration of the module frame according to the first embodiment of the manual granule spreader of the present invention; FIG. 4 is a side view showing a rotation movement of a handle frame according to the first embodiment of the manual granule spreader of the present invention; and FIG. 5 is a side view showing a vertical movement of a stand frame according to the first embodiment of the manual granule spreader of the present invention.

The manual granule spreader of the present invention will be described referring to FIGS. 1 to 5.

The manual granule spreader of the present invention includes a main body 10, a hopper 20, a spreading module 30, and a power transmission means 40.

The main body 10 includes a wheel frame 101, the module frame 102, a handle frame 103, and the stand frame 104.

The wheel frame 101 has a wheel 101a provided on a lower end part thereof so as to rotate in contact with the ground.

The module frame 102 is provided on one side of the wheel frame 101, and the module frame has the spreading module 30 combined on an upper end part thereof.

In this case, a support frame 101c having a tube body is provided by protruding upward from a first horizontal bar 101b on the one side of the wheel frame 101, and a lower end part of the module frame 102 is inserted into and fastened to the support frame 101c so as to control a vertical movement of the module frame 102.

That is, the support frame 101c includes a first fastening bolt 101e provided on one side thereof so as to press an outer surface of the module frame 102 inserted into the support frame 101c and fix the module frame 102 to the support frame 101c. Accordingly, a vertical position of the module frame 102 which is fixed to the support frame 101c may be adjusted, and thus a vertical position of the spreading module 30 provided on an upper end part of the module frame 102 may be adjusted.

Accordingly, a vertical spreading position of granules being spread from the spreading module 30 can be adjusted.

A first end part of the handle frame 103 is rotatably hinged to an upper end part of the wheel frame 101, and the handle frame includes a handle bar 103a provided on a second end part thereof Accordingly, a worker drives the wheel 101a by pushing the main body 10 by using manpower by holding the handle bar 103a with his or her hand so as to spread the granules.

Meanwhile, the wheel frame 101 includes an arc-shaped longitudinal hole 101d provided on an upper end part thereof, and the handle frame 103 and the arc-shaped longitudinal hole 101d are combined with each other by a fastening bolt such that the fastening bolt passes through the first end part of the handle frame 103 and the arc-shaped longitudinal hole 101d.

Accordingly, an angle adjustment of the handle frame 103 being rotatably hinged to the upper end part of the wheel frame 101 can be made along the arc-shaped longitudinal hole 101d by releasing or fastening the fastening bolt.

Accordingly, through the angle adjustment of the handle frame 103, a vertical position of the handle bar 103a is properly adjusted to a height of a worker, whereby a worker can perform granule spreading by pushing the main body 10 in a comfortable posture.

The stand frame 104 is provided on one side of the handle frame 103 and includes a stand 104a provided on a lower end part thereof, and the main body 10 stands with the help of the wheel 101a and the stand 104a In this case, a guide tube 103c having a tube body is provided on a second horizontal bar 103b of the one side of the handle frame 103, and an upper end part of the stand frame 104 is inserted into and fastened to the guide tube 103c so as to adjust a vertical position of the stand frame 104.

That is, a second fastening bolt 103d is provided on one side of the guide tube 103c and presses an outer surface of the stand frame 104 inserted into the guide tube 103c and fastens the stand frame 104 to the guide tube 103c. Accordingly, the vertical position of the stand frame 104 is adjusted and fixed, and thus a vertical position of the stand 104a may be properly adjusted depending on the angle adjustment of the handle frame 103.

Figure 6:
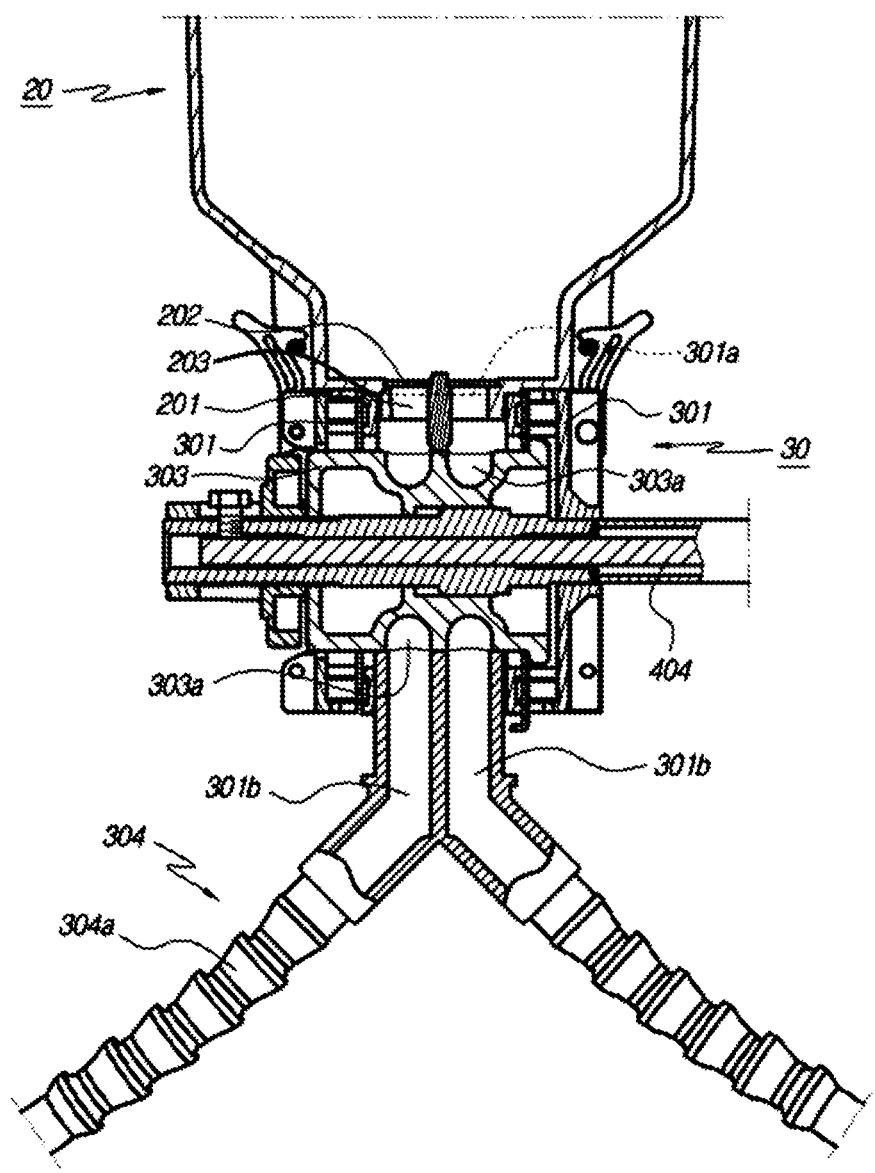
FIG. 6 is a front cross-sectional view of a spreading module according to the first embodiment of the manual granule spreader of the present invention.
Figure 7:
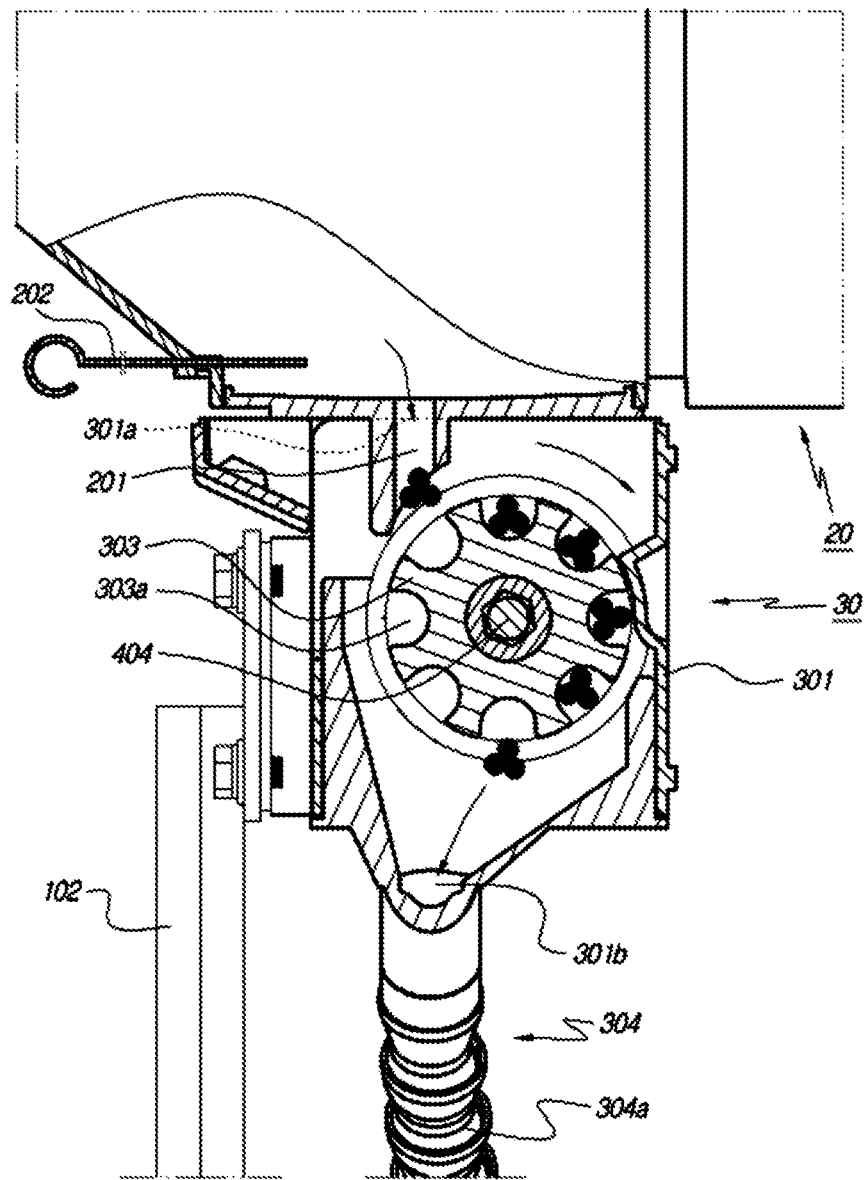
FIG. 7 is a side cross-sectional view of the spreading module according to the first embodiment of the manual granule spreader of the present invention.

FIG. 6 is a front cross-sectional view of the spreading module according to the first embodiment of the manual granule spreader of the present invention, and FIG. 7 is a side cross-sectional view of the spreading module according to the first embodiment of the manual granule spreader of the present invention.

The manual granule spreader of the present invention will be described referring to FIGS. 6 and 7.

Normally the hopper 20 is provided in a housing shape and includes a cover, which is capable of opening and closing, provided on an upper part thereof, so as to load granules such as agricultural pesticides or fertilizers in the hopper 20.

The hopper 20 is provided on an upper part of the spreading module 30, and includes discharge chutes 201 and chute plates 202 so as to supply the granules loaded in the hopper to the spreading module 30.

The discharge chutes 201 are provided in plural on a lower part of the hopper 20 at predetermined intervals so as to discharge each of the granules loaded in the hopper 20 through each of the discharge chutes 201.

Each of the chute plates 202 is provided on an upper part of the discharge chute 201 to slide to a rear of the hopper 20 so as to open and close the discharge chute 201.

To slide the chute plate 202, the hopper 20 is preferably provided with a guide groove 203 for guiding the chute plate 202.

Accordingly, when the chute plate 202 is pulled to the rear of the hopper 20, the discharge chute 201 is opened, and when the chute plate 202 is pushed to a front of the hopper 20, the discharge chute 201 is closed.

The granules are discharged through the discharge chute of one side or through the discharge chutes 201 of opposite sides by selectively opening or closing each of the chute plates 202 that opens and closes each of the plurality of discharge chutes 201. Accordingly, after the granules discharged from the discharge chutes 201 are supplied to the spreading module 30, the granules are discharged in one direction or opposite directions through outlets 301b of the spreading module 30.

Preferably, the chute plate 202 includes a grip part provided on an outer end part thereof such that a worker may slide easily the chute plate 202.

The spreading module 30 is provided on a lower part of the hopper 20 and includes a roller case 301, a spreading roller 303, and first spreading means 304 so as to spread in opposite directions the granules discharged from the hopper 20.

The roller case 301 includes inlets 301a provided on an upper part thereof and the outlets provided on a lower part thereof in opposite side directions thereof, wherein the inlets are connected to the discharge chutes 201 and the outlets communicate with the inlets 301a, and the roller case 301 includes the hopper 20 provided on an upper part thereof and on one side and an upper end part of the module frame 102 is combined on one side surface of the roller case.

Accordingly, the granules introduced to the inlets 301a are discharged through the discharge chutes 201 of the hopper 20 and then are discharged in opposite sides of the roller case 301 through each of the outlets 301b.

The spreading roller 303 is rotatably provided in the roller case 301 and includes multiple insertion grooves 303a provided on an outer circumferential surface thereof in two rows along a circumference thereof, with the granules supplied from each of the plurality of discharge chutes 201 on the lower part of the hopper 20 being inserted into the insertion grooves.

In this case, an interval between each of the insertion grooves 303a provided in two rows on the outer circumferential surface of the spreading roller 303 is preferably configured to be the same as an interval between each of the discharge chutes 201 such that the granules discharged through each of the discharge chutes 201 are directly inserted into each of the insertion grooves 303a.

Accordingly, when the discharge chute 201 is opened by the chute plate 202, the granules discharged through the opened discharge chute 201 are directly inserted into the insertion groove 303a positioned under the discharge chute 201, are conveyed to the outlet 301b of the roller case 301 by rotation of the spreading roller 303, and are discharged through the outlet 301b.

The first spreading means 304 are connected to the outlets 301b and adjust a spreading position and a vertical position of the granules discharged through the outlets 301b.

Each of the first spreading means 304 is free to adjust an angle thereof and is preferably configured to be a joint hose 304a so as to maintain the adjusted angle.

Accordingly, the granules discharged through each of the outlets 301b fall through the first spreading means 304 and are finally discharged through an opening part of a lower end part of the first spreading means 304. Accordingly, the spreading position and the vertical position at which the granules are discharged finally may be adjusted by a position adjustment of the opening part.

The manual granule spreader of the present invention will be described referring to FIGS. 1 to 7.

The power transmission means 40 transmits a rotational force of the wheel 101a to the spreading roller 303 such that the spreading roller 303 spreads granules while rotating, and includes a drive sprocket 401, a following sprocket 402, a roller chain 403, and a driving wire 404.

The drive sprocket 401 is provided on an end portion of a rotation shaft of the wheel 101a.

The following sprocket 402 is provided on one side surface of the main body 10 so as to be spaced apart from the drive sprocket 401 at a predetermined distance.

The roller chain 403 is provided to connect the drive sprocket 401 and the following sprocket 402 therebetween such that a rotational force of the drive sprocket 401 is transmitted to the following sprocket 402.

Accordingly, gear ratio of the drive sprocket 401 and the following sprocket 402 is adjusted to control a rotation number of the following sprocket 402.

A gear ratio adjustment of the drive sprocket 401 and the following sprocket 402 is performed in such a manner that a user substitutes the drive sprocket 401 and the following sprocket 402 having a required gear ratio.

A first end part of the driving wire 404 is provided on a rotation shaft of the following sprocket 402 and a second end part of the driving wire 404 is provided on a rotation shaft of the spreading roller 303, and the driving wire 404 transmits a rotational force of the following sprocket 402 to the spreading roller 303, so that the following sprocket 402 and the spreading roller 303 rotate to have the same rotation number.

Accordingly, the rotation number of the spreading roller 303 can be controlled by the gear ratio adjustment of the drive sprocket 401 and the following sprocket 402, so that a spreading amount of granules can be controlled.

That is, when a rotation speed of the spreading roller 303 to a rotation speed of the wheel 101$a$, to which the drive sprocket 401 is mounted, is increased by the gear ratio adjustment of the drive sprocket 401 and the following sprocket 402, the spreading amount of the granules is increased.

On the contrary, when the rotation speed of the spreading roller 303 to the rotation speed of the wheel 101$a$, to which the drive sprocket 401 is mounted, is decreased by the gear ratio adjustment of the drive sprocket 401 and the following sprocket 402, the spreading amount of the granules is decreased.

Meanwhile, preferably, the main body 10 includes a chain case 405 provided on the one side surface thereof such that the drive sprocket 401, the following sprocket 402, and the roller chain 403 are not exposed to an outside, but there is no limit thereto.

In addition, since the driving wire 404 is flexible, though a position of the hopper 20 is adjusted vertically, the rotational force of the wheel 101$a$ can be efficiently transmitted to the spreading roller 303 provided in the hopper 20.

Figure 8:
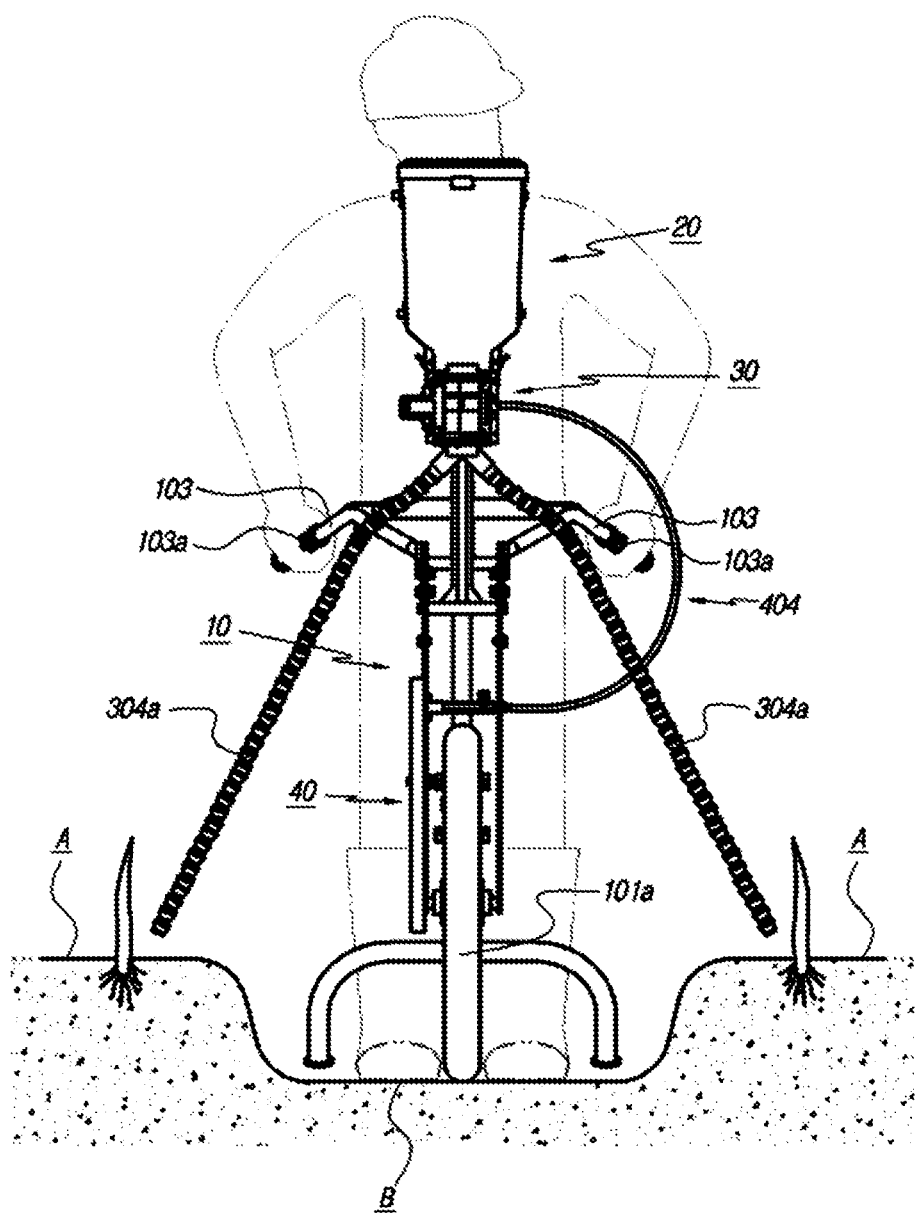
FIG. 8 is a front view showing a state in which granules are spread on a low level according to the first embodiment of the manual granule spreader of the present invention.
Figure 9:
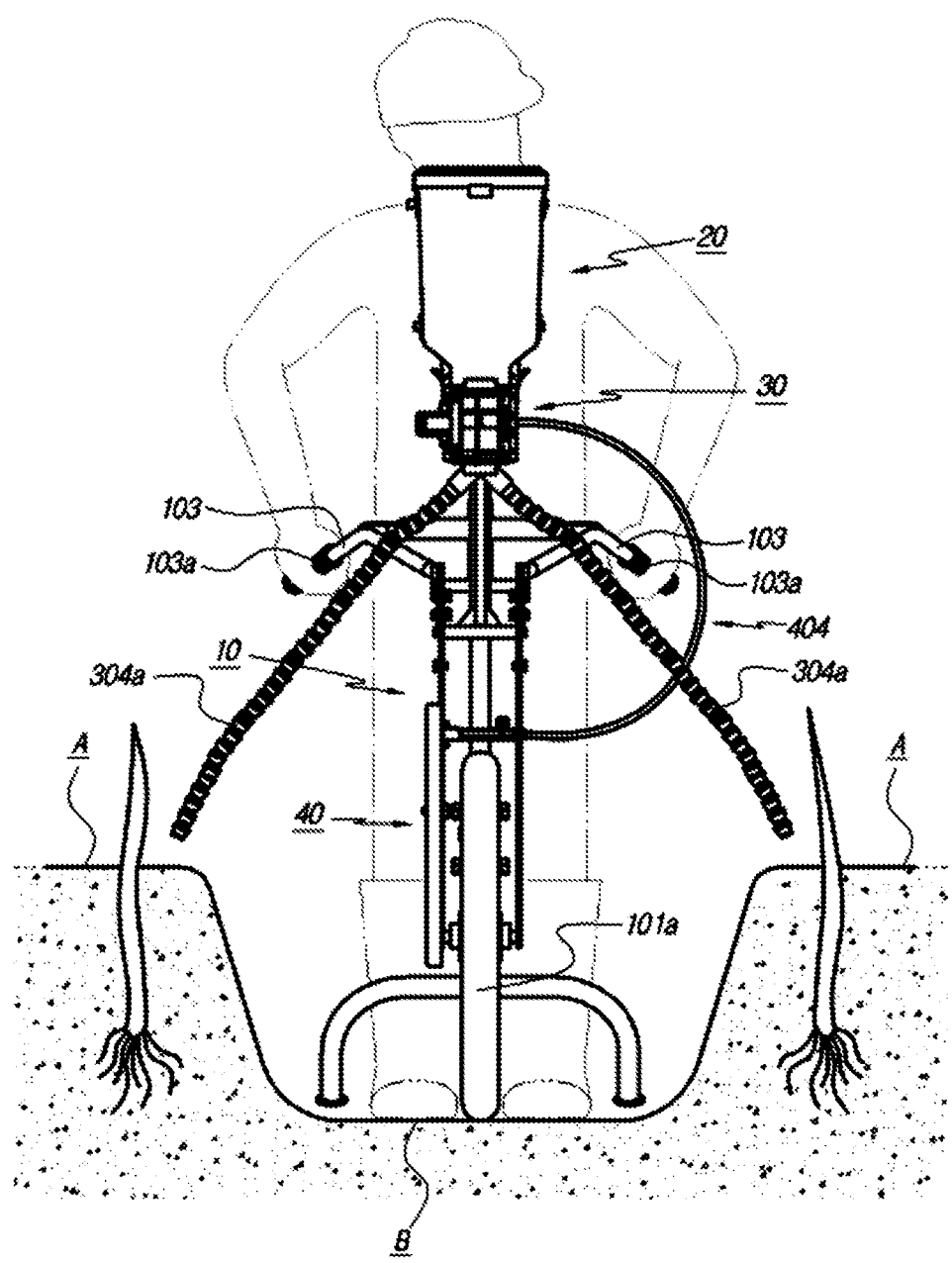
FIG. 9 is a front view showing a state in which granules are spread on a high level according to the first embodiment of the manual granule spreader of the present invention.

FIG. 8 is a front view showing a state in which granules are spread on a low level according to the first embodiment of the manual granule spreader of the present invention, and FIG. 9 is a front view showing a state in which granules are spread on a high level according to the first embodiment of the manual granule spreader of the present invention;

The manual granule spreader of the present invention will be described referring to FIGS. 8 and 9.

As shown in FIG. 8, according to the manual granule spreader of the present invention mentioned above, a worker positions the wheel 101$a$ in a furrow between ridges on opposite sides of sown crops, pushes forward and advances the main body 10 by holding the handle bar 103$a$ with hands while the stand 104$a$ does not reach the ground when the worker lifts a rear of the main body 10 to a predetermined vertical position by using a one-touch ball plunger.

As mentioned above, when the main body 10 is advanced by manpower, the wheel 101$a$ rotates in contact with the ground, and the rotational force of the wheel 101$a$ is transmitted to the spreading roller 303 by the power transmission means 40, and the granules discharged from the hopper 20 are discharged through the first spreading means 304 positioned in opposite directions under the spreading module 30.

In this case, as shown in FIG. 8, when a vertical position of each of the ridges is low, an angle adjustment of the first spreading means 304 configured to be the joint hose allows a discharge opening of a lower end of the first spreading means 304 to approach a surface of the low ridge to the maximum such that the granules are spread on a precise position.

On the contrary, as shown in FIG. 9, when a surface position of each of the ridges rises by earthing up the soil of the ridge to prevent crops from falling down or to lengthen a white part of each of crops such as scallions, the angle adjustment of the first spreading means 304 configured to be the joint hose allows the discharge opening of the lower end of the first spreading means 304 to approach a surface of the high ridge to the maximum such that the granules are spread on a precise position.

Figure 10:
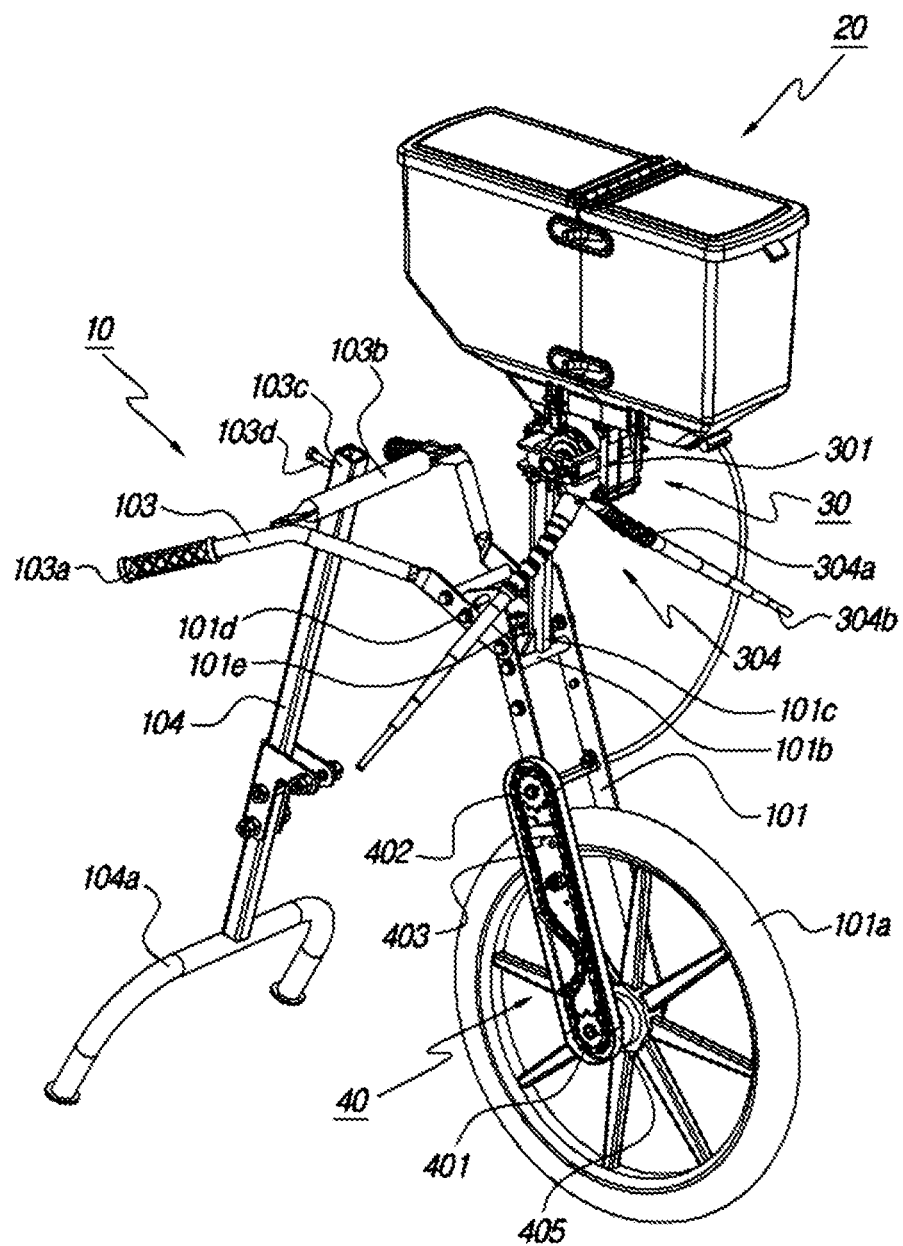
FIG. 10 is a perspective view showing first spreading means according to a second embodiment of the manual granule spreader of the present invention.
Figure 11:
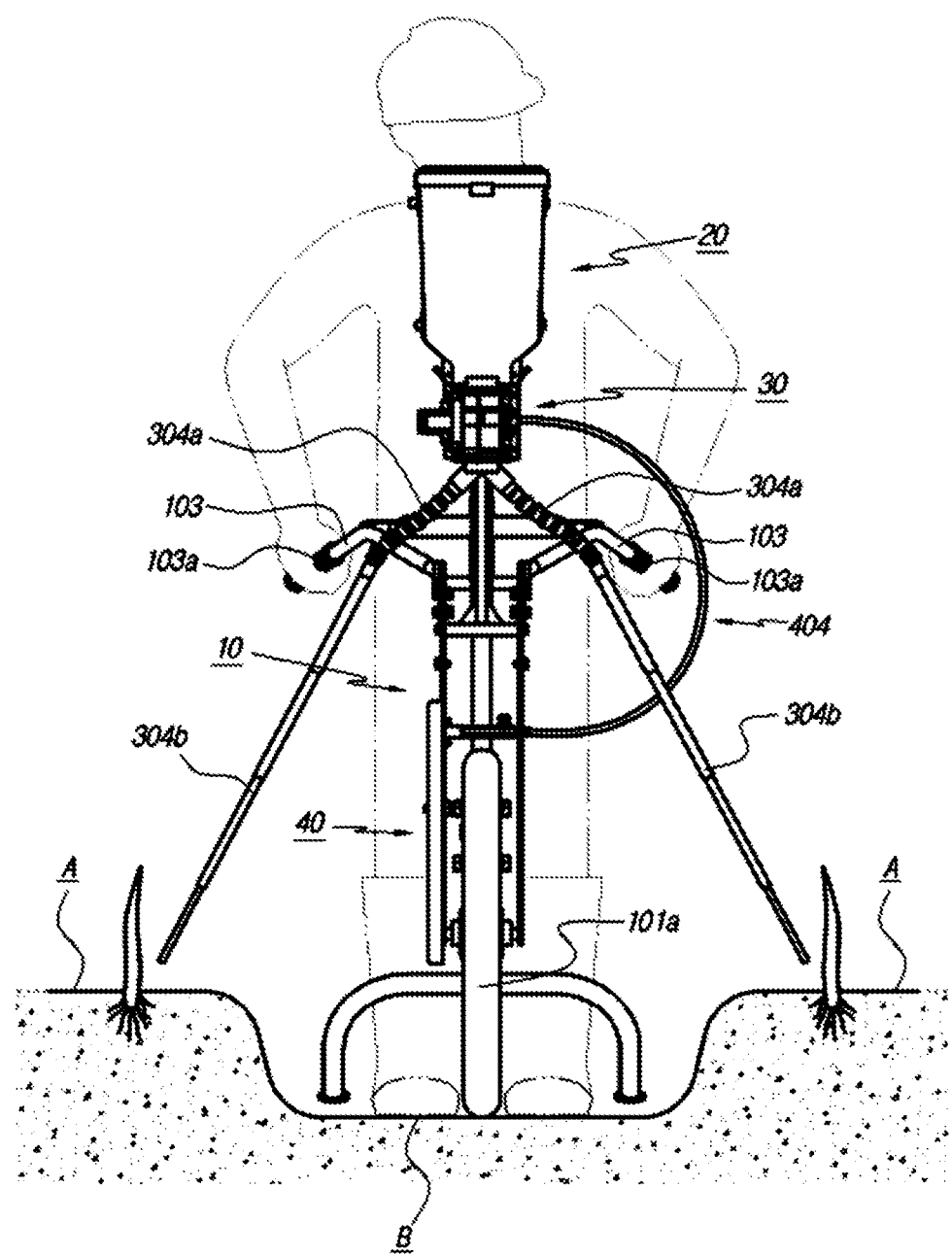
FIG. 11 is a front view showing a state of granules being spread at a low level according to the second embodiment of the manual granule spreader of the present invention.
Figure 12:
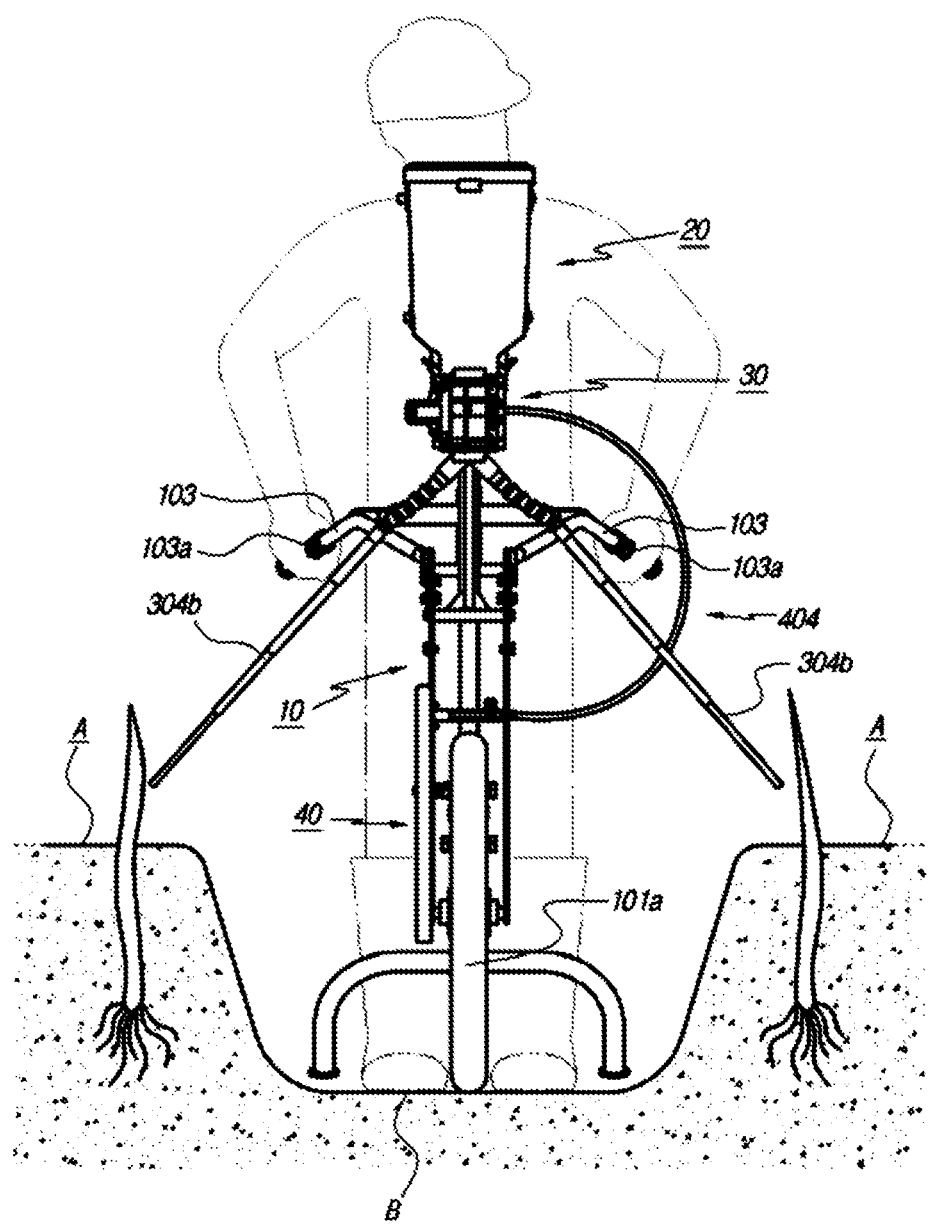
FIG. 12 is a front view showing a state of granules being spread at a high level according to the second embodiment of the manual granule spreader of the present invention.

FIG. 10 is a perspective view showing first spreading means according to a second embodiment of the manual granule spreader of the present invention, FIG. 11 is a front view showing a state of granules being spread at a low level according to the second embodiment of the manual granule spreader of the present invention, and FIG. 12 is a front view showing a state of granules being spread at a high level according to the second embodiment of the manual granule spreader of the present invention.

The manual granule spreader of the present invention will be described referring to FIGS. 10 to 12.

Each of the first spreading means 304 of the second embodiment may be configured to have a joint hose 304$a$ of a predetermined length provided on a first end part thereof and to have a telescopic tube 304$b$, which is length-adjustable, provided on a second end part thereof.

Accordingly, when a position on which granules are spread is low, the telescopic tube 304$b$ may be stretched to the maximum so as to easily spread the granules on the low position via an angle adjustment of the joint hose 304$a$.

On the contrary, when a position on which granules are spread is high, the telescopic tube 304$b$ may be contracted to the maximum so as to easily spread the granules on the high position via the angle adjustment of the joint hose 304$a$.

Figure 13:
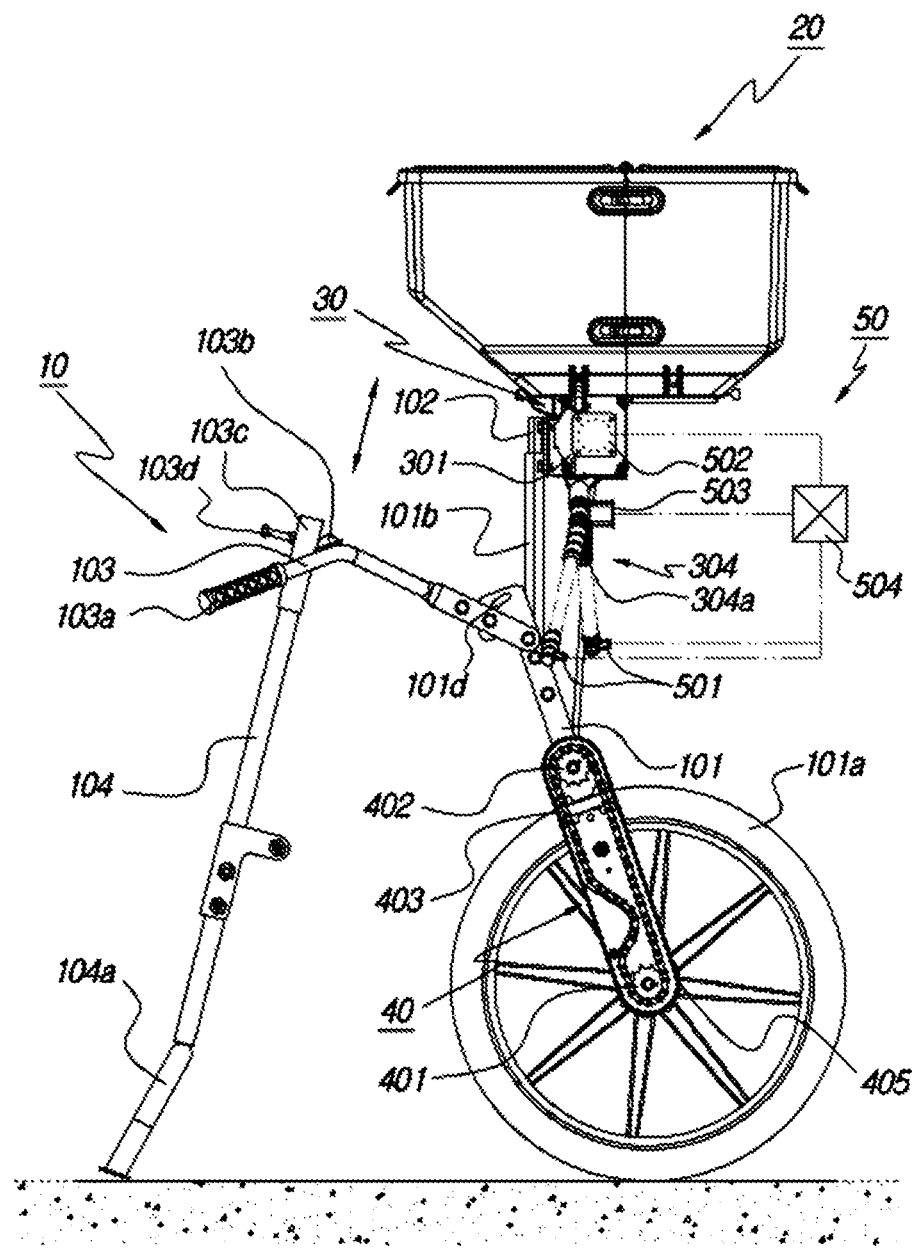
FIG. 13 is a side view showing a blockage-prevention part according to a third embodiment of the manual granule spreader of the present invention.

FIG. 13 is a side view showing a blockage-prevention part according to a third embodiment of the manual granule spreader of the present invention.

The manual granule spreader of the present invention will be described referring to FIG. 13.

The blockage-prevention part 50 detects spreading malfunction due to the blockage of granules spread by a spreading module 30 and includes a spread-detection sensor 501, vibrating means 502, 503, and a controller 504 so as to release the blockage of the granules.

The spread-detection sensor 501 is provided on each of lower end parts of first spreading means 304 so as to detect the granules spread by each of the first spreading means 304.

When granules are spread by the first spreading means 304, the spread-detection sensor 501 detects the granules by using a light sensor and transmits a spread-detection signal to the controller 504.

Each of the vibrating means is provided on one side of the spreading module 30 so as to cause vibration.

More particularly, a first vibrating motor 502 is provided on one side of a roller case 301 of the spreading module 30 so as to transmit a vibration to the roller case 301, and a second vibrating motor 503 is provided on one side of the first spreading means 304 so as to transmit a vibration to the first spreading means 304.

The controller 504 is provided on one side of the spreading module 30 and controls operations of the first vibrating motor 502 and the second vibrating motor 503 according to the signal supplied by the spread-detection sensor 501.

That is, when the spread-detection sensor 501 detecting the granules discharged from the first spreading means 304 does not transmit the spread-detection signal to the controller 504 for a predetermined hour, the controller 504 detects a spreading malfunction due to the exhaustion or blockage of the granules.

Accordingly, when the controller 504 allows the first vibrating motor 502 and the second vibrating motor 503 to operate, the roller case 301 and the first spreading means 304 vibrate, whereby the granules blocked in the roller case 301 or the first spreading means 304 are released and spread normally.

Meanwhile, the first vibrating motor 502 and the second vibrating motor 503 may vibrate alternately such that the roller case 301 and the first spreading means 304 are efficiently vibrated by the first vibrating motor 502 and the second vibrating motor 503.

Accordingly, when the first spreading means 304 is vibrated by the second vibrating motor 503 while the roller case 301 is vibrated by the first vibrating motor 502, vibration effect increases and the release of the granules due to the vibration is facilitated.

Meanwhile, the first vibrating motor 502 and the second vibrating motor 503 are described as the vibrating means, but the vibrating means are not limited thereto, and any instruments or mechanical devices that can generate vibration as a vibrating motor may be used as the vibrating means.

Figure 14:
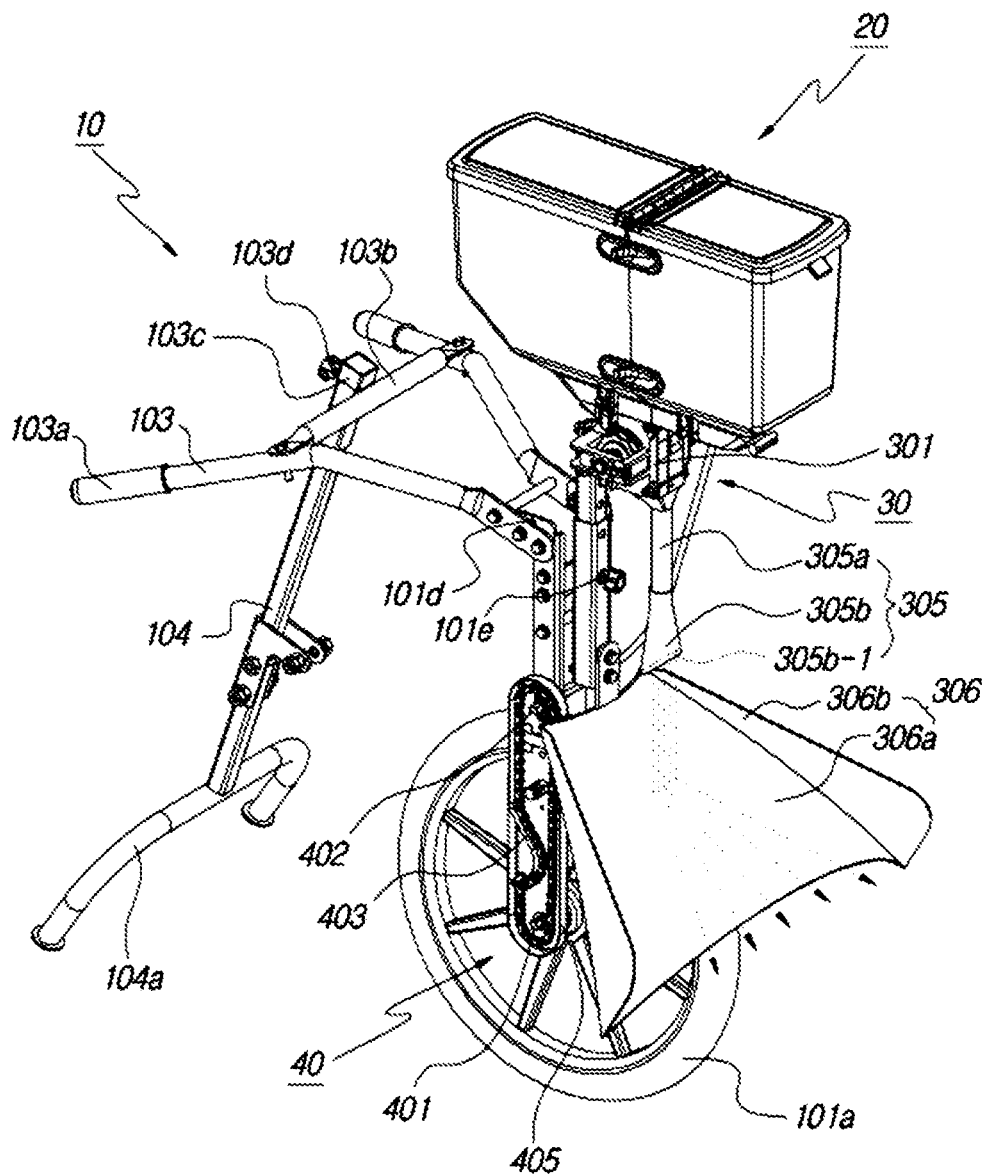
FIG. 14 is showing a perspective view showing a spreading module according to a fourth embodiment of the manual granule spreader of the present invention.

FIG. 14 is showing a perspective view showing a spreading module according to a fourth embodiment of the manual granule spreader of the present invention.

The manual granule spreader of the present invention will be described referring to FIG. 14.

The spreading module 30 may include a second spreading means 305 and a broadcast seeding plate 306 replacing first spreading means 304.

The second spreading means 305 includes a discharge tube 305a and a broadcast seeding tube 305b.

The discharge tube 305a is provided on a lower part of a roller case 301 in a vertically downward direction such that an upper end part of the discharge tube is connected to the outlets 301b provided on the lower part of the roller case 301 in the opposite side directions thereof so as to emit the granules such as a soil conditioner discharged from the roller case 301 by a spreading roller 303 in the vertically downward direction.

An upper end part of the broadcast seeding tube 305b is provided on a lower end part of the discharge tube 305a and an opening part 305b-1 narrow and long in a horizontal direction is provided on a lower end part of the broadcast seeding tube, so that the granules discharged through the discharge tube 305a are discharged in a narrow and long shape as a shape of the opening part 305b-1.

The broadcast seeding plate 306 includes side walls 306b provided integrally on opposite sides of a slanting plate 306a inclined in a downward direction, each of the side walls being narrow in a width of an upper end part thereof and wide in a width of a lower end part thereof, and is provided on a front surface of the wheel frame 101 so as to be positioned under the broadcast seeding tube 305b.

Accordingly, the granules discharged through the opening part 305b-1 of the broadcast seeding tube 305b fall on an upper side of the slanting plate 306a of the broadcast seeding plate 306, slide down along the slanting plate 306a, and are spread widely as a shape of the broadcast seeding plate 306 which is narrow in the upper end part thereof and wide in the lower end part thereof.

Accordingly, the manual granule spreader of the present invention may selectively perform the drill seeding in one direction or opposite directions by using each of the first spreading means 304 or the broadcast seeding by using the second spreading means 305.

What is claimed is:

1. A manual granule spreader comprising:
   a main body (10) including a single wheel (101a) and a handle bar (103a) so as to be driven by manpower and a wheel frame (101) having the single wheel (101a) provided on a lower end part thereof;
   a hopper (20) having a plurality of discharge chutes (201) provided on a lower part thereof, granules loaded in the hopper being discharged through the plurality of discharge chutes (201);
   a spreading module (30) provided on the lower part of the hopper (20) and on an upper part of the main body (10), the spreading module including a spreading roller (303) rotatably provided therein so as to spread the granules discharged from the hopper (20) via first spreading means (304) positioned in opposite directions under the spreading module;
   a power transmission means (40) provided on one side of the wheel frame, the power transmission means transmitting a rotational force of the single wheel (101a) to the spreading roller (303) and allowing the spreading roller (303) to spread the granules while the spreading roller is rotating,
   wherein the power transmission means (40) comprises:
   a drive sprocket (401) provided on an end portion of a rotation shaft of the single wheel (101a);
   a following sprocket (402) directly connected to the one side of the wheel frame so as to be vertically spaced apart from the drive sprocket (401) at a predetermined distance;
   a roller chain (403) connecting the drive sprocket (401) and the following sprocket (402) therebetween; and
   a driving wire (404), which is flexible, connecting a rotation shaft of the following sprocket (402) to a rotation shaft of the spreading roller (303) and being configured to transmit a rotational force of the following sprocket (402) to the spreading roller (303) so that the following sprocket and the spreading roller rotate to have the same rotation number, wherein the driving wire is configured to transmit the rotational force to the spreading roller (303) though the hopper (20) moves vertically.

2. The manual granule spreader of claim 1, wherein the main body (10) includes:
   a module frame (102) provided on the one side of the wheel frame (101), the module frame having the spreading module (30) combined on an upper end part thereof;
   a handle frame (103), a first end part of which is rotatably hinged to an upper end part of the wheel frame (101), the handle frame having the handle bar (103a) provided on a second end part thereof; and
   a stand frame (104) provided on one side of the handle frame (103), the stand frame having a stand (104a) provided on a lower end part thereof.

3. The manual granule spreader of claim 2, wherein the wheel frame (101) includes a support frame (101c) provided on the one side thereof, wherein a lower end part of the module frame (102) is inserted into and fastened to the support frame (101c) by a first fastening bolt (101e) provided on the one side of the support frame (101c) so as to control a vertical movement of the module frame (102).

4. The manual granule spreader of claim 2, wherein the wheel frame (101) includes an arc-shaped longitudinal hole (101d) provided on the upper end part thereof, wherein the handle frame (103) being rotatably hinged to the upper end part of the wheel frame (101) is bolted to the arc-shaped longitudinal hole (101d) so as to adjust an angle of the handle frame (103) along the arc-shaped longitudinal hole (101d).

5. The manual granule spreader of claim 2, wherein the handle frame (103) includes a guide tube (103c) provided on one side thereof, wherein an upper end part of the stand frame (104) is inserted into and fastened to the guide tube (103c) by a second fastening bolt (103d) provided on one side of the guide tube (103c) so as to control a vertical movement of the stand frame (104).

6. The manual granule spreader of claim 1, wherein the hopper (20) includes;
the plurality of discharge chutes (201) provided on the lower part of the hopper (20) at predetermined intervals so as to discharge the granules loaded in the hopper (20); and
a chute plate (202) provided on an upper part of each of the discharge chutes (201) to slide to a rear of the hopper (20) so as to open and close the discharge chutes (201).

7. The manual granule spreader of claim 1, wherein the spreading module (30) includes;
a roller case (301) having inlets (301a) provided on an upper part thereof and outlets (301b) provided on a lower part thereof in opposite side directions thereof, wherein the inlets are connected to the discharge chutes (201) and the outlets (301b) communicate with the inlets (301a);
the spreading roller (303) rotatably provided in the roller case (301), the spreading roller including multiple insertion grooves (303a) provided on an outer circumferential surface thereof along a circumference thereof, with the granules supplied from the plurality of discharge chutes (201) being inserted into the insertion grooves; and
the first spreading means (304) connected to the outlets (301b) so as to adjust a spreading position and a vertical position of the granules discharged through the outlets (301b).

8. The manual granule spreader of claim 7, wherein each of the first spreading means (304) is configured to be a joint hose (304a).

9. The manual granule spreader of claim 7, wherein the first spreading means (304) is configured to have a joint hose (304a) of a predetermined length provided on a first end part thereof and to have a telescopic tube (304b), which is length-adjustable, provided on a second end part thereof.

10. The manual granule spreader of claim 1, further comprising: a blockage-prevention part (50) detecting spreading-malfunction due to blockage of the granules being spread from the spreading module (30) and releasing the blockage of the granules by using vibration.

11. The manual granule spreader of claim 10, wherein the blockage-prevention part (50) includes, a spread-detection sensor (501) provided on a lower end part of each of the first spreading means (304) so as to detect the granules spread by the first spreading means (304); vibrating means (502, 503) provided on each one side of the spreading module (30) so as to cause vibration; and a controller (504) controlling each of the vibrating means via a detection signal supplied by the spread-detection sensor (501).

12. The manual granule spreader of claim 11, wherein the vibrating means includes a first vibrating motor (502) provided on one side of a roller case (301) of the spreading module (30) and a second vibrating motor (503) provided on one side of the first spreading means (304) of the spreading module (30), wherein while the first vibrating motor (502) and the second vibrating motor (503) are alternately vibrated by the controller (504) when spreading-malfunction is detected by the spread-detection sensor (501), the roller case (301) and the first spreading means (304) are alternately vibrated so as to release the granules blocked in the roller case (301) and the first spreading means (304).

13. The manual granule spreader of claim 7, wherein the spreading module (30) includes a second spreading means (305) and a broadcast seeding plate (306) replacing the first spreading means (304), wherein the second spreading means (305) includes: a discharge tube (305a) provided on a lower part of the roller case (301) in a vertically downward direction such that an upper end part of the discharge tube is connected to the outlets (301b) provided on the lower part of the roller case (301) in the opposite side directions thereof so as to emit the granules discharged from the roller case (301) by the spreading roller (303) in the vertically downward direction; and a broadcast seeding tube (305b), an upper end part of which is provided on a lower end part of the discharge tube (305a) and including an opening part (305b-1) provided on a lower end part of the broadcast seeding tube, the opening part being narrow and long in a horizontal direction, so that the granules discharged through the discharge tube (305a) are discharged in a narrow and long shape as a shape of the opening part (305b-1), and wherein the broadcast seeding plate (306) includes side walls (306b) provided integrally on opposite sides of a slanting plate (306a) inclined in a downward direction, each of the side walls being narrow in a width of an upper end part thereof and wide in a width of a lower end part thereof.

* * * * *